INVENTORS
Claude B. McCathron,
Harry C. Zeisloft
Paul Fitzpatrick
ATTORNEY 3,121,456
GAS TURBINE FUEL SYSTEM
Claude B. McCathron, Rochester, N.Y., and Harry C. Zeisloft, Flint, Mich., assignors to General Motors Corporation, Detroit, Mich., a corporation of Delaware
Filed Oct. 27, 1961, Ser. No. 148,240
11 Claims. (Cl. 158—36.4)

Our invention is directed to improved fuel systems for combustion engines and, in its preferred embodiment, is particularly suited to the characteristics and requirements of gas turbine engines. It is well known that the pursuit of accurate automatic controls for gas turbines has resulted in quite complicated and expensive fuel metering systems. There are various reasons for this, one of them being the fact that fuel flow must have a variable maximum limit to accelerate the engine rapidly without overheating or compressor surge, and must have a variable low flow limit upon decelerating the engine to avoid flame-out. The intricacy, weight, and cost of gas turbine fuel controls are not a real deterrent to the use of large high-powered engines. However, to promote the use of small engines of a few hundred horsepower it is necessary to simplify and reduce the cost of the controls.

A speed governing fuel throttle valve is entirely adequate for steady-state running of a gas turbine in some cases. In other cases, certain safety limiters which limit fuel in response to such factors as compressor discharge pressure or turbine temperature may be needed. The problem with which this invention is primarily concerned is that of overcoming a fault of the governor characteristic so far as transients of engine power setting are concerned. For example, if an engine is running at low speed and the governor speed setting is advanced to any great extent, the governor control valve will open wide and ordinarily will over-fuel the engine. Similarly, if the speed setting is substantially decreased, the governor valve tends to close to its minimum possible opening. This may reduce fuel sufficiently to extinguish the flame.

One approach to the solution of this problem lies in the use of cams moved in response to such conditions as engine speed and ambient temperature to provide variable minimum and maximum limits of metering valve area, and thus fuel flow. This leads to very considerable complexity in the fuel control.

Our invention approaches the problem from a much different basis, and results in extremely simple fuel control structure. Briefly stated, the principle of our invention lies in a variable volume reservoir or accumulator for fuel which is expanded to divert fuel temporarily from the engine during acceleration and is contracted to supply fuel temporarily to the engine during deceleration. The withdrawal of fuel during acceleration and addition of fuel during deceleration may compensate with sufficient accuracy for the large excursions of the governor valve, and thus hold fuel flow at a tolerable level, during throttle transients.

The nature of the invention and the advantages thereof will be clear to those skilled in the art from the succeeding detailed description of the preferred embodiment of the invention and the accompanying drawings thereof.

Figure 1:
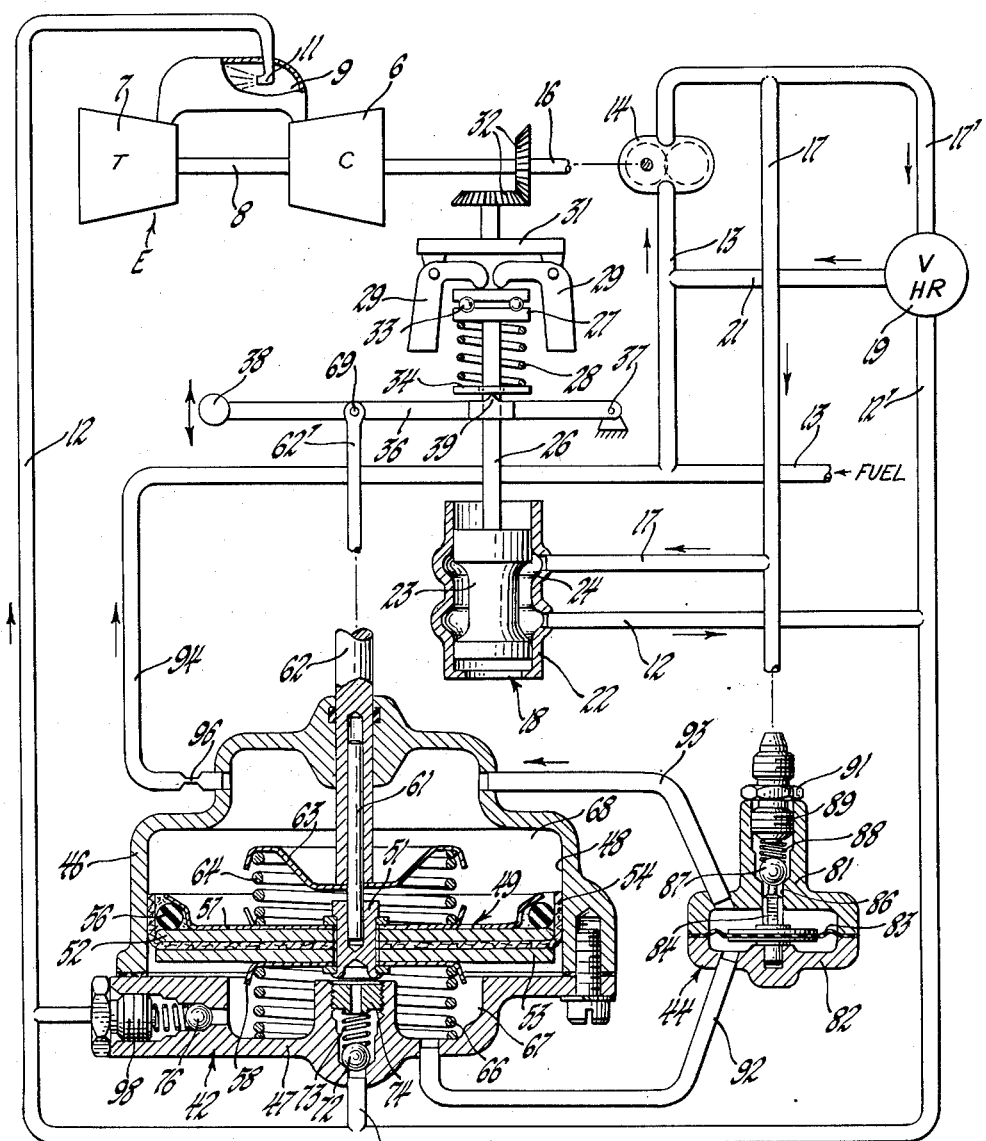
FIGURE 1 is a schematic diagram of a gas turbine fuel system.

Since the structure of the engine E is material, it is illustrated very broadly as including a compressor 6, a turbine 7 driving the compressor through a shaft 8, and combustion apparatus 9 supplied with air by the compressor and furnishing motive fluid to the turbine. The combustion apparatus includes a fuel nozzle 11 supplied through a fuel line 12. Fuel from any suitable source such as a reservoir or boost pump flows through a line 13 to pump 14, which may be driven by the turbine through a shaft 16. The pump discharges through a line 17 into a governor-controlled fuel metering valve 18 which delivers into the engine fuel line 12. Normally, the pump is of a positive displacement type and a constant metering head is maintained across the metering valve by a head regulating by-pass valve 19. This valve is connected to the pump outlet line 17 through a branch 17' and has a by-pass outlet through line 21 into the pump inlet line 13. The head regulating valve responds to the pressure drop across the metering valve, this being the difference between the pressure in line 17' and the pressure in a pressure connection 12' connecting the valve to metered fuel line 12. The structure and operation of such head regulating valves are well known to those skilled in the art.

The governor valve may have any usual or suitable structure. Conventional structure is illustrated schematically. As shown, the metering valve 18 is a balanced spool valve comprising a cylinder 22 and a spool 23. The spool variably throttles an annular port 24 through which line 17 enters the valve. The valve spool is fixed to a reciprocable stem 26 which terminates in a flange 27 biased in the direction to open the valve by a compression spring 28. The valve is biased in the closing direction by a speed responsive mechanism comprising flyweights 29 mounted on a disk 31 rotated through gearing 32 by the engine shaft 16. The flyweights 29 are coupled to the flange 27 through a thrust bearing 33.

The governor speed setting is determined by varying the compression of speeder spring 28. The spring engages an abutment 34 which is movable axially of shaft 26 by a manually operable speed setting means, shown as a lever 36 fulcrumed at 37, including a handle 38 and a knife-edge 39 engaging the abutment 34.

The structure so far disclosed is conventional. It contains nothing to prevent wide swings of fuel flow in response to changes of speed setting by control 38. The mechanism for this purpose, which is contributed by our invention, lies in the accumulator, pump, or reservoir 42 and the pressure balancing valve 44 shown in the lower part of the figure, and the connections to them. The pump 42 comprises a hollow body 46 closed by a head 47. The body defines the cylinder 48 within which a piston 49 is reciprocable. The piston comprises a hub 51, plates 52 and 53, and a cup 54 of leather or similar material held between the plates and bearing against the walls of the cylinder. An O-ring 56 held in place by a sheet metal retainer 57 biases the cup 54 against the wall. A second retainer 58 lies against the under side of the piston. A stem 61 is threaded into the piston and extends upwardly from it. The stem is guided slidably in a bore in a reciprocable actuating rod 62 which passes through the end of body 46. A spring-retaining disk 63 bears against the lower end of actuating rod 62. An upper compression spring 64 is disposed between retainer 63 and retainer 57, and a lower compression spring 66 is disposed between retainer 58 and the head 47. Preferably, these springs are matched. The piston 49 is biased toward a position in which the forces of the two springs balance. It may also be biased by fluid pressure in a first chamber 67 below the piston and a second chamber 68 above the piston. The operating rod 62 is coupled by any suitable transmission means to the speed setting lever 36; as illustrated, an extension 62' of this rod is connected by pin 69 to the speed setting lever. Note that the rod 62 is moved upwardly when the governor speed setting is increased.

The metered fuel line 12 to the engine has two connections into the chamber 67. There is a connection through a branch line 71 and a ball check valve 72 which is biased by a light spring 73 to provide a small resistance to flow into the chamber. The valve blocks flow out of the chamber through line 71. Spring 73 abuts an annular hollow retainer 74 which is threaded adjustably into the head 47. A passage for flow of fuel from chamber 67 to line 12 is provided through a check and resistance valve 76 which may be identical to valve 72. It lightly resists flow from the chamber and blocks flow into the chamber. The pressure in chamber 67 is metered fuel pressure and exerts a quite substantial force on piston 49. This force is balanced normally by fuel in chamber 68, the pressure of which is controlled by the valve 44. Valve 44 comprises a body 81 and a head 82 mounting a diaphragm 83 between them. The diaphragm has a fluted stem 84 guided in a passage 86 in the body. Stem 84 may lift a ball check 87 from its seat in the passage 86 against the light spring 88 retained by threaded ring 89. A fitting 91 provides for connection of line 12 to the valve above the valve 87. The space below diaphragms 83 is directly connected to chamber 67 of the pump by line 92, and the chamber between the diaphragm and the check valve is connected through line 93 to the chamber 68 of the pump. The chamber 68 is vented to the fuel inlet line 13 through a line 94 which is restricted by an orifice 96. Assuming a constant pressure in chamber 67, diaphragm 83 will lift ball 87 enough to supply fuel to chamber 68 as fast as it leaks through the orifice and thus will hold the pressures on both sides of the diaphragm equal. Therefore, the position of the diaphragm is not affected by the level of fluid pressure, and is determined primarily by the springs 64 and 66 in response to the position of actuating rod 62. If the pressure below the piston 49 increases, the diaphragm 83 will lift the ball 87 to increase the pressure above the diaphragm. If the pressure below the diaphragm suddenly decreases, ball 87 will seat, and the pressure in chamber 68 will drop accordingly.

It will be apparent that this pressure balance could be achieved without the constant bleed; for example, by a three-way valve actuated by the diaphragm 83, but there is a reason for preferring to use the bleed. The orifice 96 acts to control the speed of upward movement of piston 49, withdrawing fuel from the line 12. If the speed setting is increased, spring 64 is relaxed and spring 66 starts to move the piston upwardly to draw fuel from line 12. Thus pressure is unbalanced by the unbalanced spring force so that valve 87 seats and terminates flow into chamber 68. The size of orifice 96 determines, along with the force of the spring, the rate of withdrawal of fuel from line 12. The size of the hole in spring retainer 74 may also affect the flow, but, in the present embodiment, this hole is large enough so that it has no significant restricting effect. Also, the passage past stem 86 of valve 44 may have a throttling effect. By limiting inflow to chamber 68, outflow from chamber 67 is correspondingly limited. If the rod 62 is moved downward, fuel can immediately flow into chamber 68 from the pump in response to higher pressure below piston 49 than above. Thus, a pressure balance is maintained. The rate of flow from the pump to the engine on deceleration may be controlled by the size of the hole in the spring retainer 93 of check valve 76.

It is thus possible to fix a relation between rate of addition or withdrawal of fuel and the displacement of the operating rod 62 to suit the characteristics of any particular engine. The check valves 72 and 76 provide a limited resistance to flow in the normal direction which prevents minor fluctuations of fuel pressure in line 12 or slight oscillations of the operating member 62 from affecting fuel flow to the engine. While this is desirable, the valves between the chamber 67 and line 12 could be omitted without destroying the operability of the system.

Figure 2:
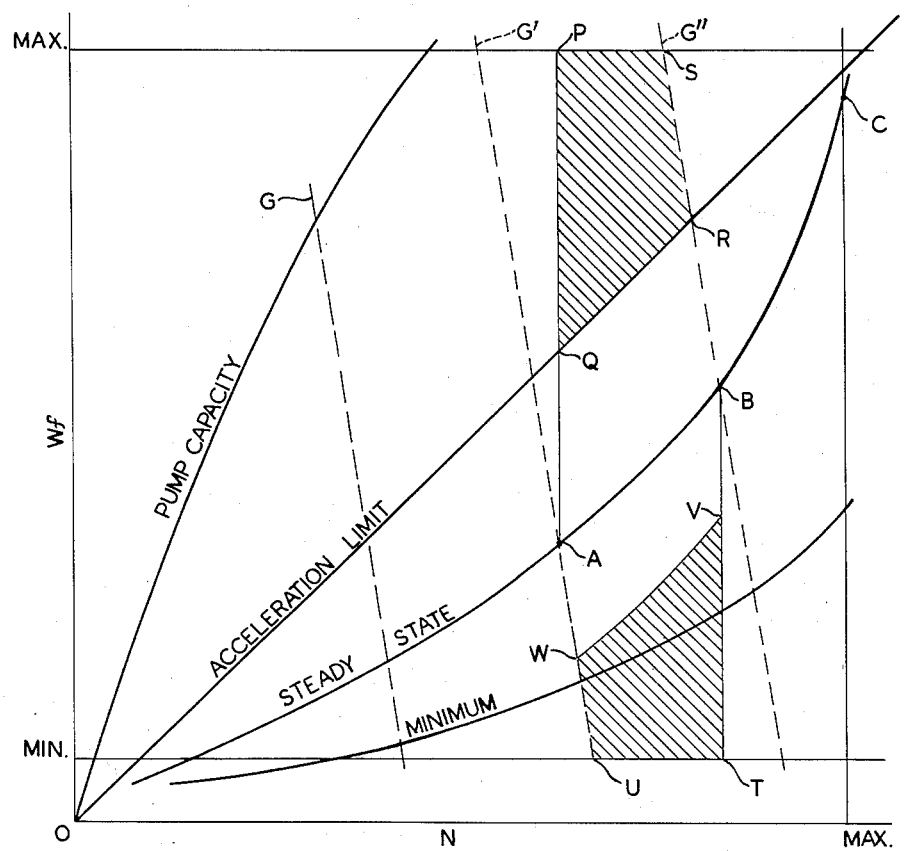
FIGURE 2 is a chart illustrating the operation of the system.

The operation of the fuel system described above should be clear. However, the mode of operation and the reasons therefor may be clarified by reference to the chart of FIGURE 2, in which $W_f$, weight of fuel in pounds per hour, is plotted against N, engine revolutions per minute. The vertical line of maximum rated engine speed is apparent, as well as the horizontal "Min." and "Max." lines which represent the flow through the metering valve at its minimum and maximum openings. The minimum and maximum flows will be constant because the head across the metering valve is held constant. The line identified as "Pump Capacity" represents the normal output of the pump and is a typical curve for a gear pump or the like. Pump capacity must be greater than the engine requirements. The excess fuel is bypassed. The line marked "Steady State" indicates the fuel required by the engine in constant speed operation. The line identified as "Acceleration Limit" represents the tolerance of the engine for fuel during acceleration; in other words, the amount of fuel which may be supplied the engine without dangerous overtemperature, compressor surge, or other adverse results. This limit curve may be substantially a straight line or may be a curve, depending upon the engine. The line indicated as "Minimum" represents the least amount of fuel which can be depended upon to maintain combustion. These lines may be assumed to be for standard sea level conditions. Changes in ambient conditions will shift them to some extent. The broken lines identified as G, G', and G'' represent the characteristics of a droop-type governor at various speed settings. The fuel flow increases as engine speed decreases with increasing external load at any given governor setting. The points identified as A, B and C on the steady-state curve represent operation at a rather low speed, a higher speed, and maximum rated speed of the engine. Governor curves G' and G'' are drawn through the points A and B.

To illustrate the application of the control, we may assume that the engine is operating at the speed and fuel rate represented by point A and the throttle lever 38 is moved abruptly to a position corresponding to the higher speed at point B. This throttle burst may open the metering valve wide, or substantially so, practically instantaneously. This change in fuel flow is represented by the vertical line AP indicating an increase to maximum fuel flow before any significant speed change. Actually, it is desired to have the flow increased only to point Q on the acceleration limit line. If the flow is suitably limited, the fuel flow will increase along the segment QR of this line until the governor characteristic curve G'' is reached, and flow will then decrease along the segment RB of this line to the steady-state condition. However, assuming that there is no flow limiter, flow would increase to the maximum and follow the maximum flow line from P to S and then decrease to B. The shaded area QPSR indicates excess fuel flow to the engine. By proportioning the piston and springs of the pump 42 and the travel of the actuating arm to the characteristics of the particular engine, the amount of actuating rod movement involved in the speed change from A to B may enlarge the chamber 67 by a volume approximately equal to the excess volume of fuel indicated by QPSR. Note that the area QPSR does not equal fuel volume, since fuel rate cannot be integrated with respect to revolutions per minute, but rather with respect to time. The upward movement of stem 62 is accompanied by a persisting enlargement of chamber 67 and storage of a definite predetermined volume of fuel. If the throttle is further advanced, as to maximum speed, additional fuel is stored in the device 42.

A similar action takes place upon deceleration of the engine. Assume that the throttle is moved sharply back to cut engine speed from B to A. The relaxation of spring 28 allows the flyweights 29 to move the throttle valve member 23 against its stop, and flow through the metering valve decreases to the minimum at point T and follows the minimum line to point U at which flow will increase along the governor characteristic to point A. This would result in reduction of flow below the minimum volume and therefore in flame-out of the engine. However, the reduction in engine speed setting causes pump 42 to discharge fuel, and the fuel flow to the engine may be increased thus to a value such as that represented by the line VW. This line may be somewhat above the minimum flow line but this does no harm. It will slightly extend the time for deceleration, but, ordinarily, this is not a matter of concern. Gas turbine engines ordinarily decelerate more rapidly than they accelerate, and acceleration is the critical problem rather than deceleration.

The foregoing will make clear that our invention provides a means for accomplishing satisfactory accelerations and decelerations of gas turbines without mechanical acceleration or deceleration limiters. The advantages of the invention in providing a simple lightweight control will be obvious.

The detailed description of the preferred embodiment of the invention is not to be considered as limiting the invention, since many modifications may be made within the scope thereof by exercise of skill in the art.

We claim:

1. A gas turbine fuel control system comprising, in combination, a fuel metering valve, a variable-speed governor controlling the valve, movable setting means for the governor, and a displacement pump connected to the outlet of the metering valve to take fuel from or add fuel to the metered fuel flow, the pump including a movable fuel-displacing member resiliently coupled to the governor setting means for transmission of motion from the setting means to the said member and moved to draw fuel into the pump from the said outlet in response to increase in governor speed setting.

2. A gas turbine fuel control system comprising, in combination, a fuel metering valve, a variable-speed governor controlling the valve, movable setting means for the governor, a displacement pump connected to the outlet of the metering valve to take fuel from or add fuel to the metered fuel flow, the pump including a movable fuel-displacing member resiliently coupled to the governor setting means for transmission of motion from the setting means to the said member and moved to draw fuel into the pump from the said outlet in response to increase in governor speed setting, and hydraulic means retarding movement of the fuel-displacing member.

3. A gas turbine fuel control system comprising, in combination, a fuel metering valve, a variable-speed governor controlling the valve, movable setting means for the governor, a displacement pump connected to the outlet of the metering valve to take fuel from or add fuel to the metered fuel flow, the pump including a movable fuel-displacing member resiliently coupled to the governor setting means for transmission of motion from the setting means to the said member and moved to draw fuel into the pump from the said outlet in response to increase in governor speed setting, and means to balance the fuel pressure on the fuel-displacing member.

4. A gas turbine fuel control system comprising, in combination, a fuel metering valve, a variable-speed governor controlling the valve, movable setting means for the governor, a displacement pump connected to the outlet of the metering valve to take fuel from or add fuel to the metered fuel flow, the pump including a movable fuel-displacing member resiliently coupled to the governor setting means for transmission of motion from the setting means to the said member and moved to draw fuel into the pump from the said outlet in response to increase in governor speed setting, means to balance the fuel pressure on the fuel-displacing member, and hydraulic means retarding movement of the fuel-displacing member.

5. A gas turbine fuel system comprising, in combination, a source of fuel under pressure, a fuel metering valve supplied thereby, an engine-driven governor controlling the metering valve, a movable speed-setting means connected to the governor, a line conducting the fuel from the metering valve to the engine, and an acceleration flow compensator having a hollow body, a movable wall in the body providing an expansible chamber, means including reverse parallel check valves connecting the chamber to the said line, and resilient motion-transmitting means connecting the movable wall to the speed-setting means operable to bias the movable wall in the direction to enlarge the chamber when the speed-setting means is moved so that the governor speed setting is increased and reduce the chamber when the speed-setting means is moved so that the governor speed setting is decreased.

6. A gas turbine fuel system comprising, in combination, a source of fuel under pressure, a fuel metering valve supplied thereby, an engine-driven governor controlling the metering valve, a movable speed-setting means connected to the governor, a line conducting the fuel from the metering valve to the engine, and an acceleration flow compensator having a hollow body, a movable wall in the body dividing the space therein into two chambers, means connecting the first chamber to the said line, means responsive to pressure in the chambers operative to admit fluid from the source to the second chamber to balance the pressures therein, and resilient motion-transmitting means connecting the movable wall to the speed-setting means operable to bias the movable wall in the direction to enlarge the first chamber and reduce the second chamber when the speed-setting means is moved so that the governor speed setting is increased.

7. A gas turbine fuel system comprising, in combination, a source of fuel under pressure, a fuel metering valve supplied thereby, an engine-driven governor controlling the metering valve, a movable speed-setting means connected to the governor, a line conducting the fuel from the metering valve to the engine, and an acceleration flow compensator having a hollow body, a movable wall in the body dividing the space therein into two chambers, means including reverse parallel check valves connecting the first chamber to the said line, means responsive to pressure in the chambers operative to admit fluid from the source to the second chamber when the pressure therein is less than that in the first chamber, a bleed from the second chamber, and resilient motion-transmitting means connecting the movable wall to the speed-setting means operable to bias the movable wall in the direction to enlarge the first chamber and reduce the second chamber when the speed-setting means is moved so that the governor speed setting is increased.

8. A gas turbine fuel control system comprising, in combination, a fuel metering valve, a variable-speed governor controlling the valve, movable setting means for the governor, a variable-volume reservoir for fuel connected to the outlet of the metering valve to take fuel from or add fuel to the meter fuel flow, the reservoir including movable means controlling the volume of the reservoir, and means coupling the said movable setting means to the said movable controlling means for transmission of motion so as to enlarge the reservoir in response to increase in governor speed setting and contract the reservoir in response to reduction in governor speed setting.

9. A fuel control system as recited in claim 8 in which the coupling means includes an impositive connection.

10. A gas turbine fuel control system comprising, in combination, a fuel metering valve, a variable-speed governor controlling the valve, movable setting means for the governor, a displacement pump connected to the outlet of the metering valve to take fuel from or add fuel to the metered fuel flow, the pump including movable fluid-displacing means, and means coupling the said movable setting means to the said movable fluid-displacing means for transmission of motion so as to draw fuel into the pump in response to increase in governor speed setting and discharge fuel from the pump in response to reduction in governor speed setting.

11. A fuel control system as recited in claim 10 in which the coupling means includes an impositive connection.

References Cited in the file of this patent
UNITED STATES PATENTS

| | | |
|---|---|---|
| 2,980,175 | Szydlowski | Apr. 18, 1961 |
| 3,017,922 | Peterson | Jan. 23, 1962 |